(12) United States Patent
Kwon et al.

(10) Patent No.: US 12,218,781 B2
(45) Date of Patent: Feb. 4, 2025

(54) ENHANCEMENT OF CHANNEL ESTIMATION IN WIRELESS COMMUNICATION BASED ON SUPERVISED LEARNING

(71) Applicant: Samsung Electronics Co., Ltd., Gyeonggi-do (KR)

(72) Inventors: Hyukjoon Kwon, San Diego, CA (US); Kee-Bong Song, San Diego, CA (US); Nitin Jonathan Myers, Austin, TX (US); Yacong Ding, San Diego, CA (US)

(73) Assignee: Samsung Electronics Co., Ltd (KR)

( * ) Notice: Subject to any disclaimer, the term of this patent is extended or adjusted under 35 U.S.C. 154(b) by 355 days.

(21) Appl. No.: 17/694,129

(22) Filed: Mar. 14, 2022

(65) Prior Publication Data

US 2022/0337455 A1    Oct. 20, 2022

Related U.S. Application Data

(60) Provisional application No. 63/174,302, filed on Apr. 13, 2021.

(51) Int. Cl.
*H04L 25/02* (2006.01)
*H04L 27/26* (2006.01)

(52) U.S. Cl.
CPC ........ *H04L 25/0224* (2013.01); *H04L 25/022* (2013.01); *H04L 27/2636* (2013.01)

(58) Field of Classification Search
CPC .............. H04L 25/0224; H04L 25/022; H04L 27/2636
See application file for complete search history.

(56) References Cited

U.S. PATENT DOCUMENTS

| | | |
|---|---|---|
| 2005/0265490 A1* | 12/2005 | Sestok ................ H04L 25/0232 375/340 |
| 2009/0059885 A1* | 3/2009 | Sadek ................. H04L 25/0232 370/343 |
| 2020/0328870 A1 | 10/2020 | Kim et al. |
| 2021/0143883 A1 | 5/2021 | Yerramalli et al. |
| 2021/0266210 A1 | 8/2021 | Namgoong et al. |
| 2021/0306182 A1 | 9/2021 | Kim et al. |
| 2021/0314198 A1 | 10/2021 | Kwon |

FOREIGN PATENT DOCUMENTS

KR    10-2021-0079882    6/2021

* cited by examiner

*Primary Examiner* — Natasha W Cosme
(74) *Attorney, Agent, or Firm* — The Farrell Law Firm, P. C.

(57) ABSTRACT

Disclosed is an electronic device including a processor and memory, the processor being configured to perform frequency interpolation on a channel estimation at all resource elements (REs) located where a demodulation reference signal is transmitted, perform time interpolation on a frequency domain interpolated channel obtained from the frequency interpolation, and calculate an enhanced channel estimation based on channel estimates at REs in a frequency domain and REs in a time domain, the channel estimates being output from the time interpolation.

20 Claims, 14 Drawing Sheets

ENHANCEMENT OF CHANNEL ESTIMATION IN WIRELESS COMMUNICATION BASED ON SUPERVISED LEARNING

PRIORITY

This application is based on and claims priority under 35 U.S.C. § 119(e) to U.S. Provisional Application Ser. No. 63/174,302, which was filed in the U.S. Patent and Trademark Office on Apr. 13, 2021, the contents of which are incorporated herein by reference.

BACKGROUND

1. Field

The disclosure relates generally to wireless communication, and more particularly, to enhancement of channel estimation in a fifth generation (5G) new radio (NR) wireless communication system.

2. Description of Related Art

Channel estimation is a vital aspect of 5G NR physical layer operation. In NR, information is transmitted over time-frequency resource elements (REs) on a physical downlink shared channel (PDSCH). To decode this information, channels of REs over which data is transmitted need to be estimated. In order to estimate these channels, known pilots referred to as demodulation reference signals (DMRS) are transmitted. Estimating the channel from a DMRS in NR is challenging since there are far fewer DMRSs than the number of REs over which data is transmitted. This problem is exacerbated by hardware complexity constraints.

A conventional channel estimation algorithm estimates channels at PDSCH data REs using linear minimum mean squared error (LMMSE) based linear interpolation along the frequency and time dimensions. The LMMSE method requires the channel frequency and time correlation between different REs, which can be obtained from the estimated power delay profile (PDP) and Doppler spread.

There are some drawbacks for the conventional algorithm, however. Due to narrowband (NB) precoding, the channel estimation can only be performed based on the DMRS within a precoding resource block group (PRG). In the conventional algorithm, only a limited number of DMRSs within a PRG can be utilized to estimate a channel due to hardware complexity constraints. In some channel estimation algorithms, the linear interpolation over frequency and time must be independently performed due to hardware complexity constraints, thereby causing a failure to jointly exploit time and frequency properties. Furthermore, precoding tends to vary per PRG, which disables a user equipment (UE) from performing denoising in a time domain.

As such, there is a need in the art for a machine learning channel estimation method that overcomes these shortcomings of the conventional channel estimation algorithm.

SUMMARY

The present disclosure has been made to address at least the above-mentioned problems and/or disadvantages and to provide at least the advantages described below.

Accordingly, an aspect of the present disclosure is to provide a method and apparatus focused on supervised learning which trains a neural network to refine the estimated channel.

Another aspect of the present disclosure is to provide a method and apparatus in which input features to a neural network are channel estimates from a conventional algorithm, and the ideal channels are utilized as the output labels of the neural network, thereby enabling the neural network to be trained as a mapping function which refines the channel estimates from the conventional algorithm towards the ideal channel.

In accordance with an aspect of the disclosure, an electronic device includes at least one processor, and at least one memory operatively connected with the at least one processor, the at least one memory storing instructions, which when executed, instruct the at least one processor to perform frequency interpolation on a channel estimation at all resource elements (REs) located where a demodulation reference signal is transmitted, perform time interpolation on a frequency domain interpolated channel obtained from the frequency interpolation, and calculate an enhanced channel estimation based on channel estimates at REs in a frequency domain and REs in a time domain, the channel estimates being output from the time interpolation.

In accordance with an aspect of the disclosure, an electronic device includes at least one processor, and at least one memory operatively connected with the at least one processor, the at least one memory storing instructions, which when executed, instruct the at least one processor to perform frequency interpolation on a channel estimation at all REs located where a DMRS is transmitted, calculate an enhanced channel estimation based on a frequency domain interpolated channel obtained from the frequency interpolation, and perform time interpolation on the enhanced channel estimation.

In accordance with an aspect of the disclosure, an electronic device includes at least one processor, and at least one memory operatively connected with the at least one processor, the at least one memory storing instructions, which when executed, instruct the at least one processor to perform frequency interpolation on a channel estimation at all REs located where a DMRS is transmitted, perform time interpolation on a frequency domain interpolated channel obtained from the frequency interpolation, perform training of a neural network based on channel estimates at REs in a frequency domain and REs in a time domain as input from the time interpolation, and output a time and frequency domain ideal channel based on the training of the neural network.

In accordance with an aspect of the disclosure, an electronic device includes at least one processor, and at least one memory operatively connected with the at least one processor, the at least one memory storing instructions, which when executed, instruct the at least one processor to perform frequency interpolation on a channel estimation at all REs located where a DMRS is transmitted, obtain channel estimates by performing time interpolation on a frequency domain interpolated channel obtained from the frequency interpolation, transform the channel estimates into a Doppler-delay domain by applying a two-dimensional discrete Fourier transform and inverse discrete Fourier transform (2D-DFT-IDFT) to the channel estimates at REs in a frequency domain and REs in a time domain, input the channel estimates transformed into the Doppler-delay domain into a neural network, apply the 2D-DFT-IDFT to a time and frequency domain ideal channel, and calculate an ideal Doppler-delay domain channel by applying an output of the 2D-DFT-IDFT applied to the time and frequency domain ideal channel to refined channel estimates output from the neural network.

In accordance with an aspect of the disclosure, an electronic device includes at least one processor, and at least one memory operatively connected with the at least one processor, the at least one memory storing instructions, which when executed, instruct the at least one processor to perform frequency interpolation on a channel estimation at all REs located where a DMRS is transmitted, obtain channel estimates by performing time interpolation on a frequency domain interpolated channel obtained from the frequency interpolation, transform the channel estimates into a Doppler-delay domain by applying a two-dimensional discrete Fourier transform and inverse discrete Fourier transform (2D-DFT-IDFT) to the channel estimates at REs in a frequency domain and REs in a time domain, input the channel estimates transformed into the Doppler-delay domain to a neural network, apply a 2-dimensional inverse discrete Fourier transform and discrete Fourier transform (2D-IDFT-DFT) to the refined channel estimates output from the neural network, and obtain an enhanced channel estimation based on an output of the 2D-IDFT-DFT.

In accordance with an aspect of the disclosure, an electronic device includes at least one processor, and at least one memory operatively connected with the at least one processor, the at least one memory storing instructions, which when executed, instruct the at least one processor to obtain candidate nodes of a primary network and a secondary network, perform weighting on the candidate nodes of the primary network and the secondary network, output the weighted nodes to arrive at weighted vectors, sum the weighted vectors by performing a summing operation, and obtain a final network output based on output nodes from the summing operation.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION

Figure 1:
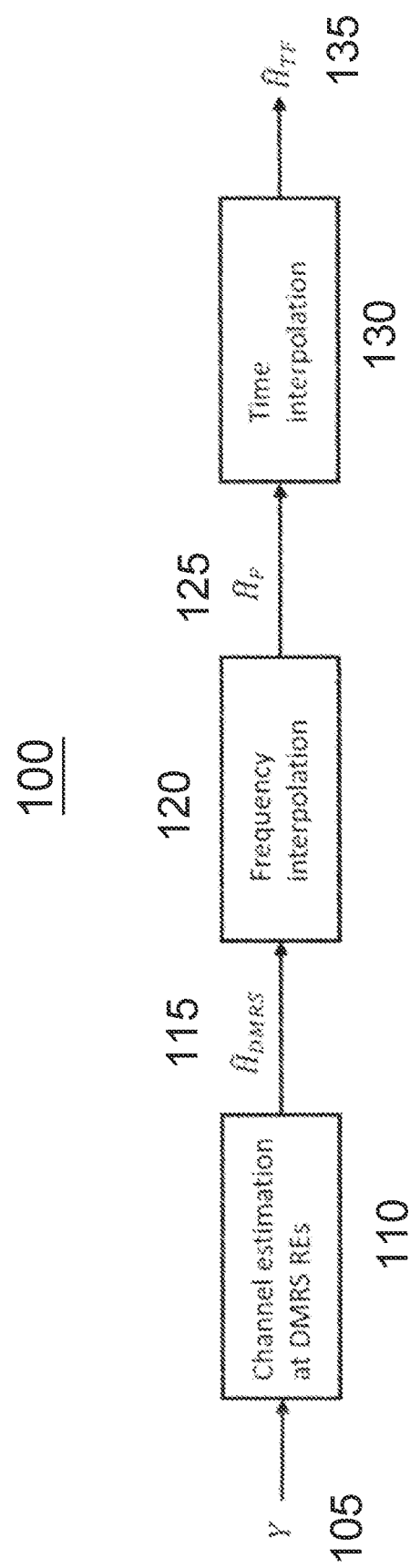
FIG. 1 illustrates a channel estimation algorithm, according to the conventional art.

Embodiments of the present disclosure will be described herein below with reference to the accompanying drawings. However, the embodiments of the disclosure are not limited to the specific embodiments and should be construed as including all modifications, changes, equivalent devices and methods, and/or alternative embodiments of the present disclosure. Descriptions of well-known functions and/or configurations will be omitted for the sake of clarity and conciseness.

The expressions "have," "may have," "include," and "may include" as used herein indicate the presence of corresponding features, such as numerical values, functions, operations, or parts, and do not preclude the presence of additional features. The expressions "A or B," "at least one of A or/and B," or "one or more of A or/and B" as used herein include all possible combinations of items enumerated with them. For example, "A or B," "at least one of A and B," or "at least one of A or B" indicate (1) including at least one A, (2) including at least one B, or (3) including both at least one A and at least one B.

Terms such as "first" and "second" as used herein may modify various elements regardless of an order and/or importance of the corresponding elements, and do not limit the corresponding elements. These terms may be used for the purpose of distinguishing one element from another element. For example, a first user device and a second user device may indicate different user devices regardless of the order or importance. A first element may be referred to as a second element without departing from the scope the disclosure, and similarly, a second element may be referred to as a first element.

When a first element is "operatively or communicatively coupled with/to" or "connected to" another element, such as a second element, the first element may be directly coupled with/to the second element, and there may be an intervening element, such as a third element, between the first and second elements. To the contrary, when the first element is "directly coupled with/to" or "directly connected to" the second element, there is no intervening third element between the first and second elements.

All of the terms used herein including technical or scientific terms have the same meanings as those generally understood by an ordinary skilled person in the related art unless they are defined otherwise. The terms defined in a generally used dictionary should be interpreted as having the same or similar meanings as the contextual meanings of the relevant technology and should not be interpreted as having ideal or exaggerated meanings unless they are clearly defined herein. According to circumstances, even the terms defined in this disclosure should not be interpreted as excluding the embodiments of the disclosure.

The systems and methods disclosed herein train a neural network, such as a multi-layer perceptron (MLP) neural network, for example, to refine channel estimates from the conventional channel estimation algorithm. The neural network acts as a mapping function that maps the input feature to the output label. This is a data-driven method rather than a model-driven method as in the conventional art.

The systems and methods disclosed herein perform channel estimation enhancement based on both data and DMRS symbols. The input features are time-frequency domain channel estimates and Doppler-delay domain channel estimates corresponding to both data and DMRS symbols per resource block (RB). The output labels are an ideal Doppler-delay domain channel corresponding to both data and DMRS symbols per unit of resource, such as per RB, PRG, or bandwidth part (BWP), for example. The Doppler-delay domain channels are obtained by applying 2-dimensional discrete Fourier transform and inverse discrete Fourier transform (2D-DFT-IDFT) to the time-frequency domain channels.

The systems and methods disclosed herein perform channel estimation enhancement based on DMRS symbols. The input features are time-frequency domain channel estimates corresponding to DMRS symbols per unit of resource. The output labels are ideal channel corresponding to DMRS symbols per unit of resource. The network contains a layer with fixed (i.e., un-trainable) weights which performs time interpolation.

In the algorithm disclosed herein, the channel estimation is based on a neural network having channel estimates from the conventional algorithm as the input, rather than the channel estimation being based on LMMSE interpolation along the frequency and time domain. In the disclosed algorithm, the channel estimation enhancement can be performed based on channel estimates corresponding to both data and DMRS symbols per unit of resource, or only based on channel estimates corresponding to DMRS symbols per unit of resource.

FIG. 1 illustrates a channel estimation algorithm 100 according to the conventional art. In FIG. 1, Y 105 denotes the received signal at REs in a PRG where the DMRS is transmitted. $\hat{H}_{DMRS}$ 115 denotes channel estimation 110 at REs where the DMRS is transmitted. $\hat{H}_F$ denotes the frequency domain interpolated channel 125 obtained after frequency interpolation 120 of the channel estimation 110 and includes channel estimates at all REs within a PRG in terms of the frequency domain. $\hat{H}_{TF}$ 135 denotes the time-frequency domain interpolated channel obtained after time interpolation 130 of the frequency domain interpolated channel 125 and includes channel estimates at all REs within a PRG in terms of the frequency domain. The time domain includes all REs where either the DMRS or data is transmitted.

Figure 2:
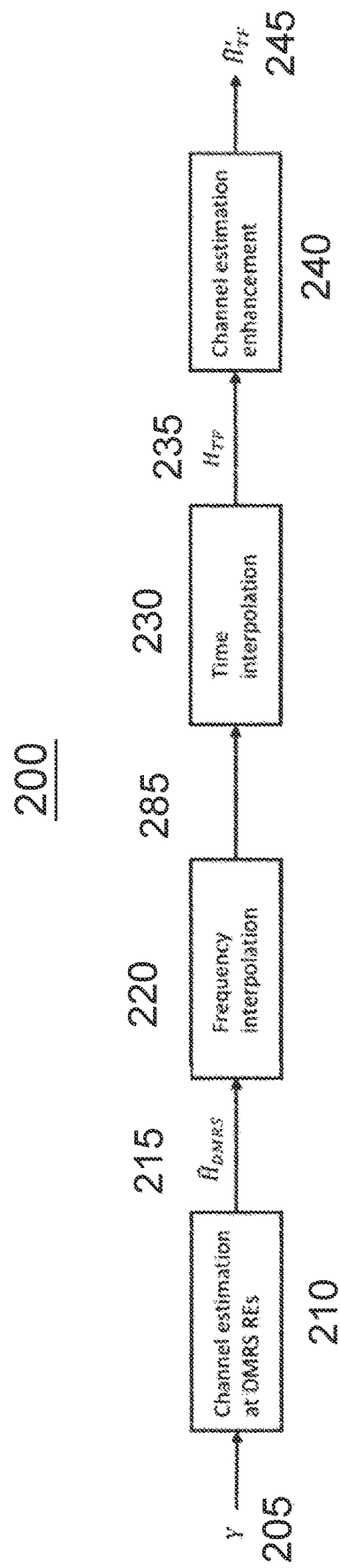
FIG. 2 illustrates a process of a channel estimation enhancement based on both data and DMRS symbols, according to an embodiment.

FIG. 2 illustrates a process 200 of a channel estimation enhancement based on both data and DMRS symbols, according to an embodiment. In FIG. 2, the input to the channel estimation enhancement block is the time-frequency domain interpolated channel $\hat{H}_{TF}$ 235 estimated by the conventional channel estimation algorithm 105-130 in FIG. 1, which is identical to 205-230 in FIG. 2. Similar to the description in FIG. 1, $\hat{H}_{TF}$ 235 in FIG. 2 contains channel estimates at all REs within an RB in the frequency domain, and all REs where either DMRS or data is transmitted in the time domain. In FIG. 2, however, $\hat{H}'_{TF}$ 245 denotes the refined channel after channel estimation enhancement 240.

Figure 3:
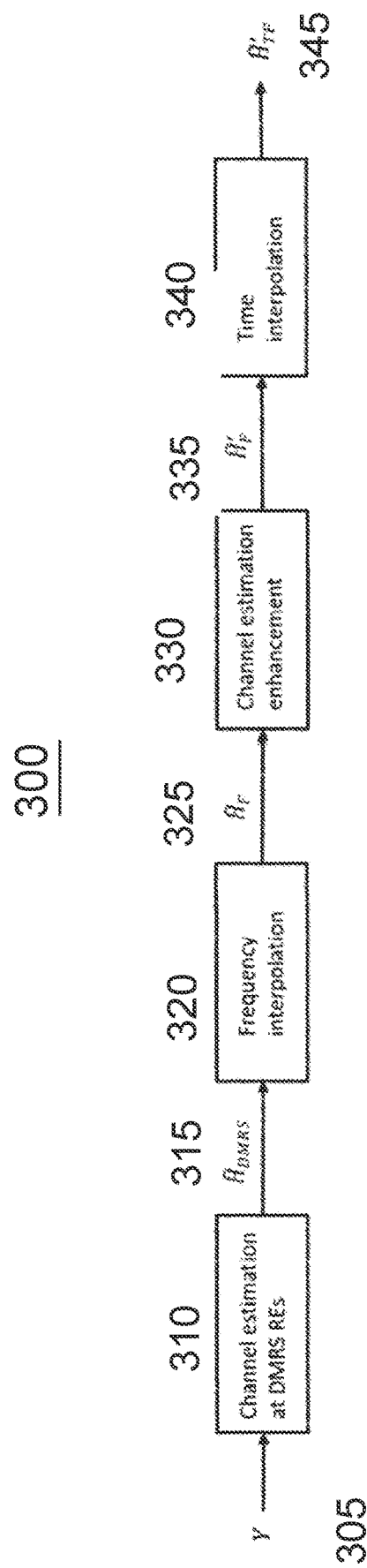
FIG. 3 illustrates a process of a channel estimation enhancement based on DMRS symbols, according to an embodiment.

FIG. 3 illustrates a process 300 of a channel estimation enhancement based on DMRS symbols, according to an embodiment. In FIG. 3, the input to the channel estimation enhancement block 330 is the frequency domain interpolated channel $\hat{H}_F$ 325 estimated by conventional channel estimation algorithm 105-125 in FIG. 1, which is identical to 305-325 in FIG. 3. Similar to the description in FIG. 1, $\hat{H}_F$ 325 in FIG. 3 contains channel estimates at all REs within an RB in the frequency domain, and REs where DMRS is transmitted in the time domain. In FIG. 3, however, $\hat{H}'_F$ 335 denotes the refined channel after channel estimation enhancement 330, corresponding to the same set of REs as $\hat{H}_F$ 325. $\hat{H}'_{TF}$ 345 is obtained after time interpolation 340 based on $\hat{H}'_F$ 335.

For channel estimation enhancement based on both data and DMRS symbols in a slot-based refinement manner, time-frequency domain enhancement and Doppler-delay domain enhancement are disclosed herein.

Figure 4:
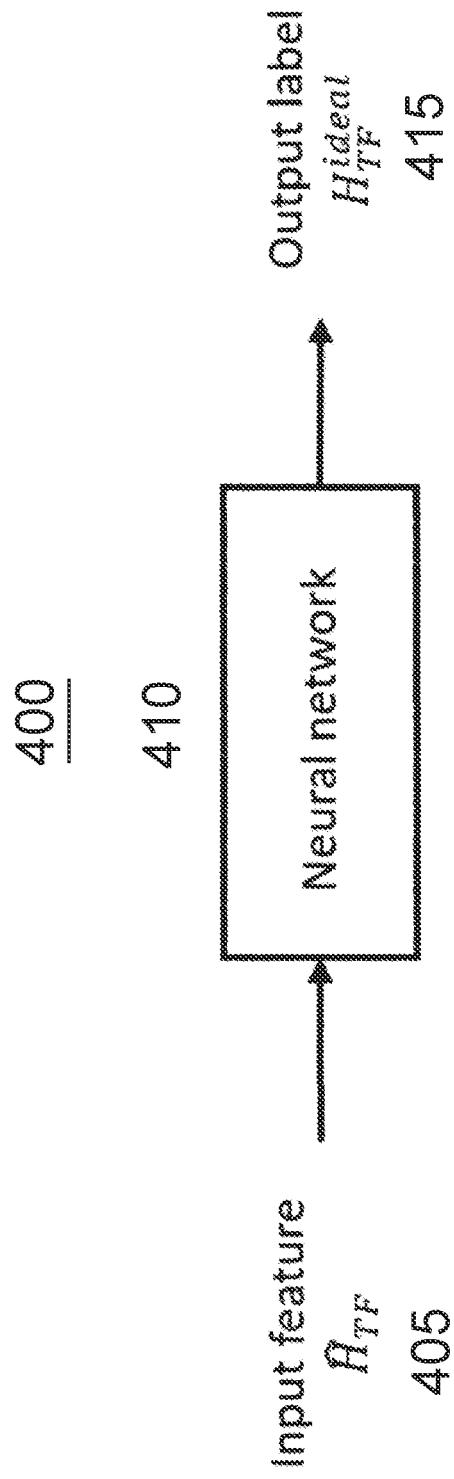
FIG. 4 illustrates a network structure for a time-frequency domain channel estimation enhancement, according to an embodiment.
Figure 14:
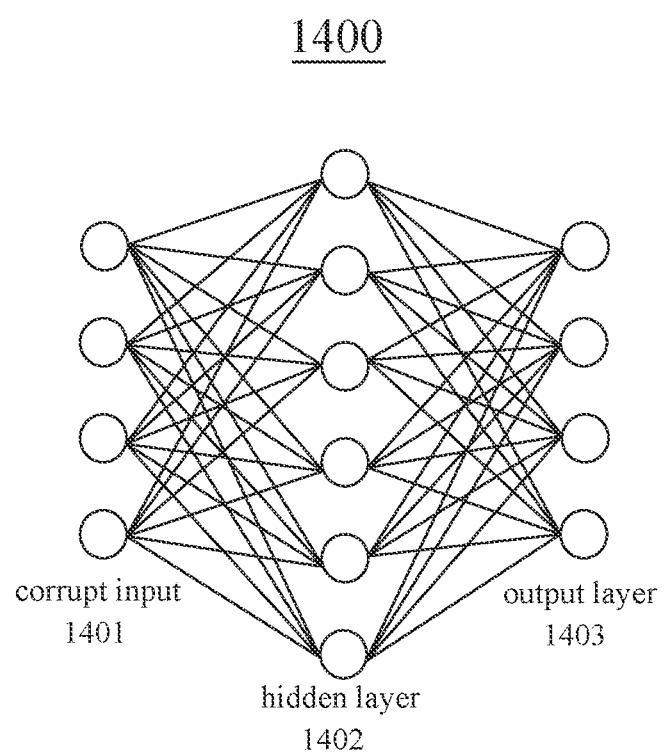
FIG. 14 illustrates a denoising autoencoder to which the disclosure is applied.

FIG. 4 illustrates a network structure 400 for a time-frequency domain channel estimation enhancement, according to an embodiment. In FIG. 4, which is DMRS-based, the input features are time-frequency domain channel estimates $\hat{H}_{TF}$ 405 from the conventional channel estimation algorithm 105-135 in FIG. 1. The neural network 410 is trained, as will be described below, and output labels are a time-frequency domain ideal channel $H_{TF}^{ideal}$ 415 corresponding to the same REs as in the input feature $\hat{H}_{TF}$ 405. In such time-frequency domain channel estimation enhancement, a denoising autoencoder 1400 is used to refine all time-frequency elements per unit, such as per RB or per bundle. An example of the denoising autoencoder 1400 is illustrated in FIG. 14. Accordingly, complexity and size of the network structure are reduced, and the use of convolution techniques is avoided, for example.

It is noted that the training loss, further described below with reference to FIG. 5, can use a mean square error, as expressed in the following fraction where MLP is a multilayer perceptron.

$$\frac{\sum_{s=1}^{S} \|MLP_p(x^{(s)}) - y^{(s)}\|}{S}$$

A main aspect of this slot-based channel estimation is to refine the legacy channel estimate, i.e., the $N_{sc} \times (N_{sym} - N_{ctrl})$ matrix $H_{RCE}$, using a learning algorithm. The refinement is performed on a slot-by-slot basis over each RB. The input feature vector in slot-based channel estimation is constructed using $H_{RCE}$, and has dimensions $N_{in} = 2N_{sc}(N_{sym} - N_{ctrl})$. The MLP output dimensions is $N_{out} = 2N_{sc}(N_{sym} - N_{ctrl})$. To train the MLP network in slot-based channel estimation, a dataset is first obtained by stacking a collection of $H_{RCE}$ matrices obtained over different transmit and receive layers, and different RBs within each layer. These layers correspond to a radio frequency chain in the multiple-input multiple-output system and are distinct from the layers in MLP (i.e., the neural network).

A dataset containing a collection of ideal channel estimations (ICE), i.e., $H_{ICE}$s, corresponding to the legacy channel estimations (RCEs) is also constructed. Both the RCE and ICE datasets are obtained by dumping channels using a simulator. The neural network is ultimately trained using the RCE-based dataset and the corresponding ICE dataset. It is expected that the network predicts ICE when RCE is given as an input. In practice, however, there can be error in the refined channel estimation due to noise in the training dataset and limited function approximation capability of the disclosed neural network. The trained neural network is useful when the error in the refined channel estimation is less than the error in RCE.

During inference, the trained network is used to obtain a refined channel estimate which is subsequently used for equalization, interference whitening, and symbol detection. The performance of the MLP-based network is evaluated in terms of the block error rate (BLER).

Figure 5:
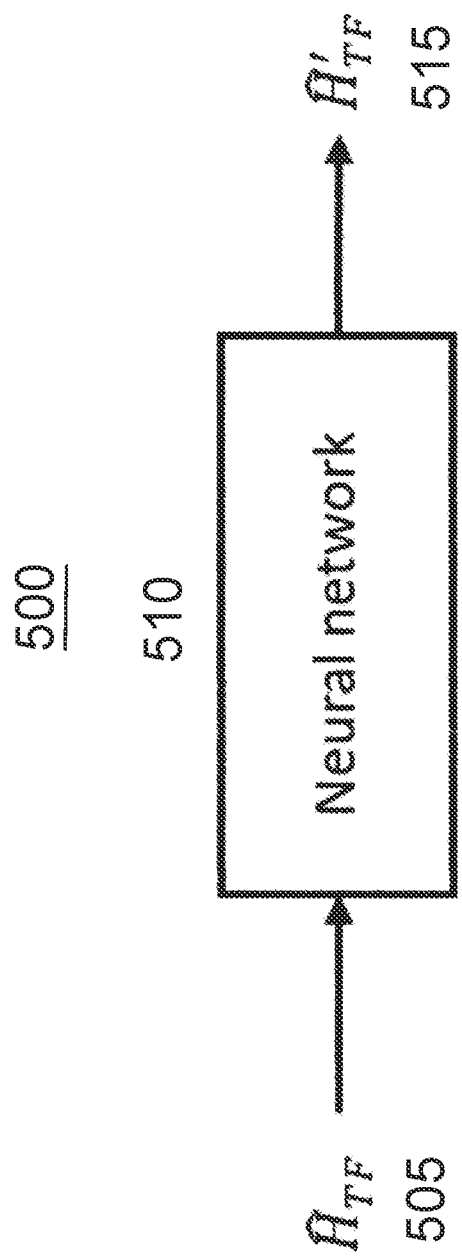
FIG. 5 illustrates a time-frequency domain channel estimation enhancement, according to an embodiment.

FIG. 5 illustrates a time-frequency domain channel estimation enhancement 500, according to an embodiment. After the neural network 510 is trained, during inference, channel estimates $\hat{H}_{TF}$ 505 from the conventional algorithm are input to the neural network 510 to generate refined channel estimates $\hat{H}'_{TF}$ 515, as shown in FIG. 5.

In particular, for time-frequency domain channel estimation enhancement, the time-frequency channel estimate with the legacy method, i.e., $H_{RCE}$, is used to construct the $2(N_{sym}-N_{ctrl})N_{sc} \times 1$ input feature vector, as in Equation (1) below.

$$x = \begin{bmatrix} vec(\text{Re}\{H_{RCE}\}) \\ vec(\text{Im}\{H_{RCE}\}) \end{bmatrix}, \quad (1)$$

which is obtained by stacking the real and imaginary components of $H_{RCE}$. The vector corresponding to the ideal channel is defined as in Equation (2) below.

$$y = \begin{bmatrix} vec(\text{Re}\{H_{ICE}\}) \\ vec(\text{Im}\{H_{ICE}\}) \end{bmatrix} \quad (2)$$

Learning-based channel estimation first involves learning a mapping function from a set of pairs $\{(x^{(s)}, y^{(s)})\}_{s=1}^{S}$, obtained as an output from a simulator. Then, the learned mapping is used during inference for channel estimation refinement.

The neural network described above is used to approximate the mapping between the RCE and the ICE. The output of the network when x is applied at the input is defined as in Equation (3) below.

$$\hat{y} = MLP_p(x). \quad (3)$$

For the training set with time-frequency refinement (TFR), the mean square error loss is defined in the approximation as in Equations (4) and (5) below.

$$L_{TFR} = \frac{\sum_{k=1}^{S} \|\hat{y}^{(s)} - y^{(s)}\|^2}{S} \quad (4)$$

$$= \frac{\sum_{k=1}^{S} \|MLP_p(x^{(s)}) - y^{(s)}\|^2}{s}. \quad (5)$$

The network parameters, i.e., the weights and the biases of $MLP_p(\bullet)$, are optimized to minimize the training loss $L_{TFR}$. If $p_{TFR}$ denotes the optimized parameters, the vectorized channel estimation with time-frequency refinement is given by $\hat{y} = MLP_{p_{TFR}}(x)$, where x denotes the RCE obtained with the legacy method. It is observed from Equation (2) that the real and the imaginary parts of the vectorized estimated channel can be extracted from the first and the second half of $\hat{y}$. The channel estimation with the time-frequency refinement is obtained by reshaping the vectorized CE into an $N_{sc} \times (N_{sym}-N_{ctrl})$ matrix, i.e., as in Equation (6) below.

$$\hat{H}_{TFR} = \text{Reshape}\left(\hat{y}\left[1:\frac{N_{out}}{2}\right], [N_{sc}, N_{sym}-N_{ctrl}]\right) + \quad (6)$$
$$j \text{ Reshape}\left(\hat{y}\left[1+\frac{N_{out}}{2}:N_{out}\right], [N_{sc}, N_{sym}-N_{ctrl}]\right).$$

Figure 6:
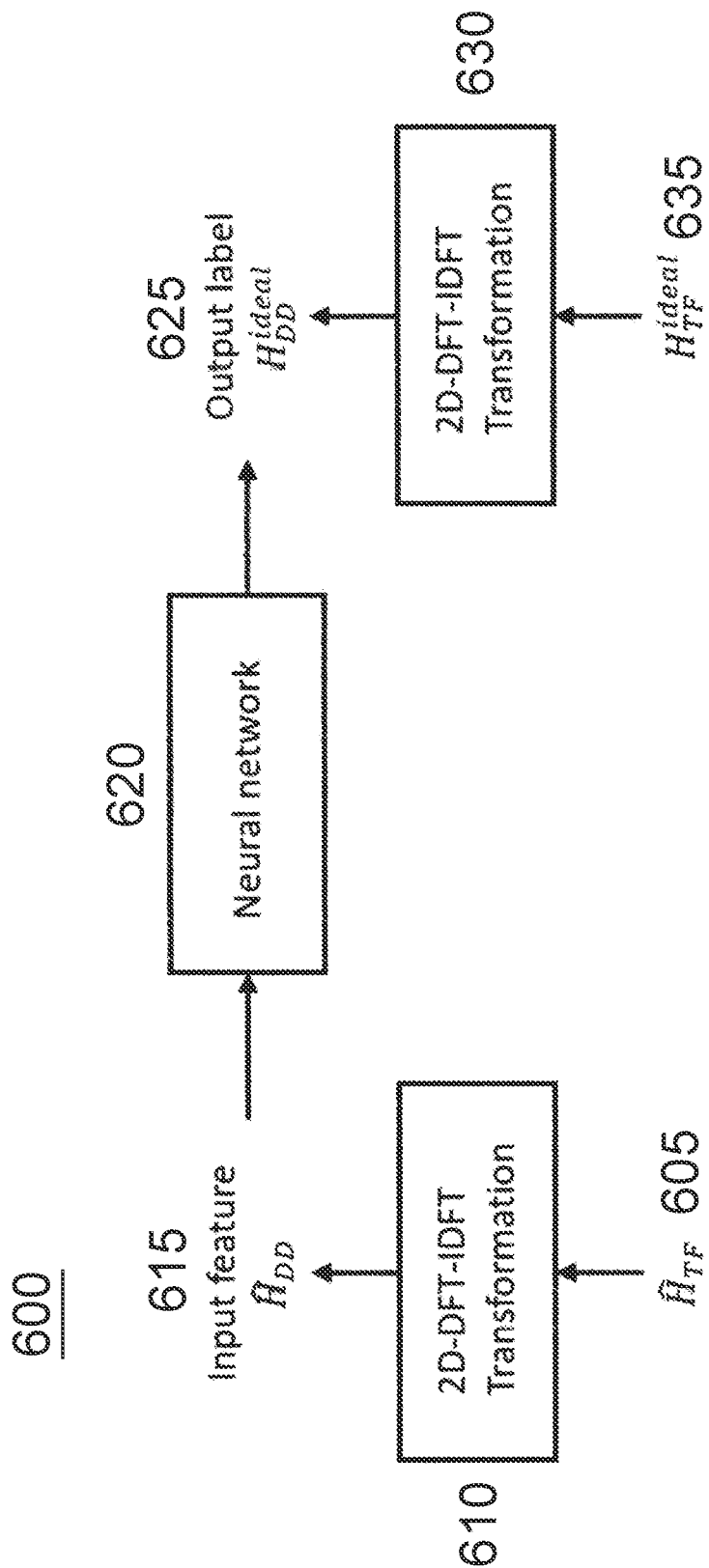
FIG. 6 illustrates a network structure for a Doppler-delay domain channel estimation enhancement, according to an embodiment.

FIG. 6 illustrates a network structure 600 for a Doppler-delay domain channel estimation enhancement, according to an embodiment. In FIG. 6, which is DMRS-based, the input feature includes Doppler-delay domain channel estimates $\hat{H}_{DD}$ 615, which are obtained by applying 2D-DFT-IDFT transformation 610 on time-frequency domain channel estimates $\hat{H}_{TF}$ 605 from conventional channel estimation algorithm. The output label is the ideal Doppler-delay domain channel $H_{DD}^{ideal}$ 625, which is obtained offline from the simulator and is used for training. That is, the output label is refined channel estimates output from the neural network 620 to an output of a 2D-DFT-IDFT transformation 630 applied to the time-frequency domain ideal channel $H_{TF}^{ideal}$ 635. In other words, the refined channel estimate outputs are obtained by applying the legacy channel estimate output, with 2D-DFT-IDFT transformation 630, into the neural network 620.

For 2D-DFT-IDFT transformation 610, U is denoted as a DFT matrix, and the transformation from $\hat{H}_{TF}$ 605 to $\hat{H}_{DD}$ 615 is then given in Equation (7) below.

$$\hat{H}_{DD} = U^H \hat{H}_{TF} U \quad (7)$$

In Equation (7), $U^H$ denotes the conjugate transpose of U.

As noted above, the embodiments of FIGS. 4 and 6 use DMRS symbols. Thus, channel estimation is refined at the location of the DMRS symbols. These methods use $H_{FDI}$, the frequency domain interpolated channel at the DMRS locations, to construct the input features. Specifically, the input feature vector is defined as in Equation (8) below.

$$x = \begin{bmatrix} vec(\text{Re}\{H_{FDI}\}) \\ vec(\text{Im}\{H_{FDI}\}) \end{bmatrix}. \quad (8)$$

The methods using the DMRS symbols perform channel estimation refinement by exploiting channel structure across multiple DMRS locations when $N_{dmrs} > 1$. Such a structure is not exploited with frequency domain interpolation which operates on a per-symbol basis.

The output of the network in the channel estimation refinement using the DMRS symbols is the refined channel at the DMRS locations. Therefore, the network is trained using ICE subsampled at the DMRS symbol locations. For training, we first construct a set $\|_{dmrs} = \{i_1 - N_{ctrl},$ $i_2-N_{ctrl}, \ldots i_{N_{dmrs}}-N_{ctrl}\}$. Then, the output features in DGR are constructed as in Equation (9) below.

$$y = \begin{bmatrix} vec(\text{Re}\{H_{ICE}(:,\mathbb{I}_{dmrs})\}) \\ vec(\text{Im}\{H_{ICE}(:,\mathbb{I}_{dmrs})\}) \end{bmatrix}. \tag{9}$$

It is observed that the dimensions of x and y in this method are $N_{in}=2N_{sc}N_{dmrs}$ and $N_{out}=2N_{sc}N_{dmrs}$. The pair of vectors $\{(x^{(s)}, y^{(s)})\}_{s=1}^{S}$ are obtained from the simulation and the MSE loss is used to train the three layer network shown in FIG. 4.

During inference, the conventional linear minimum mean square error (LMMSE)-based frequency domain interpolation is first performed to obtain $H_{FDI}$. Then, the input feature vector x is constructed from $H_{FDI}$ using Equation (8), and then sent through the trained MLP network. The output of the network $\hat{y}$ is reshaped into a refined channel at the DMRS locations using Equation (10) below.

$$\hat{M}_{DGR} = \text{Reshape}\left(\hat{y}\left[1:\frac{N_{out}}{2}\right], [N_{sc}, N_{dmrs}]\right) + \tag{10}$$
$$j \, \text{Reshape}\left(\hat{y}\left[1+\frac{N_{out}}{2}:N_{out}\right], [N_{sc}, N_{dmrs}]\right).$$

Time interpolation is performed over the rows of $\hat{M}_{DGR}$ to get the CE, as in Equation (11) below.

$$\hat{H}_{DGR}=\hat{M}_{DGR}\beta_{LMMSE} \tag{11}$$

In Equation (11), $\beta_{LMMSE}$ is the same time-domain interpolation matrix used in the legacy method and the coefficients in $\beta_{LMMSE}$ are derived from the power delay profile.

Figure 7:
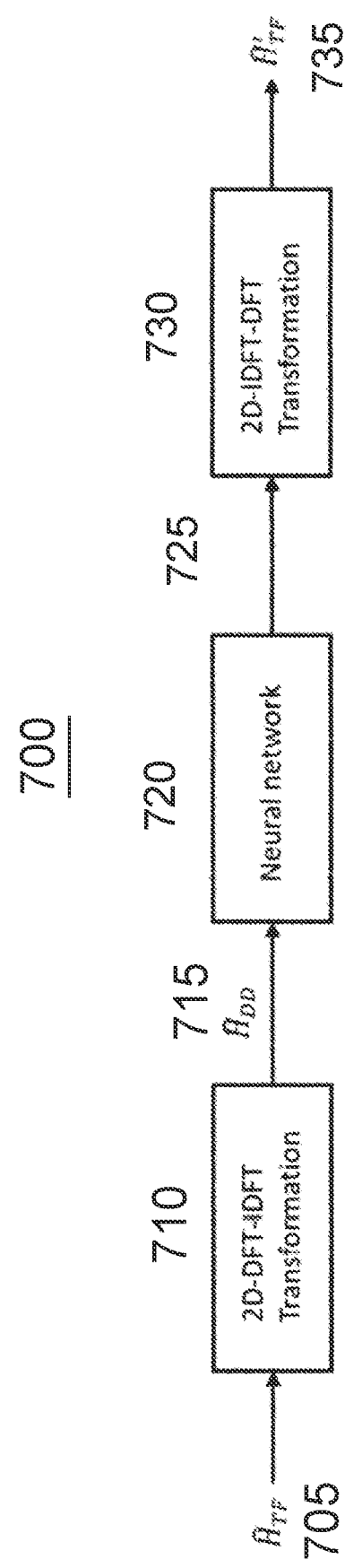
FIG. 7 illustrates a Doppler-delay domain channel estimation enhancement, according to an embodiment.

FIG. 7 illustrates a process 700 of a Doppler-delay domain channel estimation enhancement, according to an embodiment. Specifically, the inference process shown in FIG. 7 occurs after the neural network 720 is trained.

Channel estimates from conventional algorithm $\hat{H}_{TF}$ 705 are first transformed 710 into the Doppler-delay domain $\hat{H}_{DD}$ 715, which is then input to the neural network 720 to generate refined channel estimates $\hat{H}'_{DD}$ 725. Note that $\hat{H}'_{DD}$ 725 is in the Doppler-delay domain; therefore, a 2-dimensional inverse discrete Fourier transform and discrete Fourier transform (2D-IDFT-DFT) transformation 730 is applied to $\hat{H}'_{DD}$ 725 to transform $\hat{H}'_{DD}$ 725 back to the time-frequency domain $\hat{H}'_{TF}$ 735 as the final enhancement results, or in other words, the enhanced channel estimation in the time-frequency domain. Note that 2D-IDFT-DFT transformation 730 performs inverse transformation of 2D-DFT-IDFT, as shown in Equation (12) below.

$$\hat{H}'_{TF}=U\hat{H}'_{DD}U^H \tag{12}$$

It is beneficial to train the neural network at a Doppler-delay domain since information is further concentrated, thereby resulting in fewer connections in the network. As such, network complexity is reduced.

In particular, consider the time-frequency channel matrix H, whose rows and columns represent the subcarrier and the time dimensions. The factor $U_{freq}$ is used to denote the DFT matrix of dimensions $N_{sc} \times N_{sc}$, and $U_{time}$ as the DFT matrix of dimensions $(N_{sym}-N_{ctrl}) \times (N_{sym}-N_{ctrl})$. By applying the IDFT along every column of H followed by a DFT along every row of the resultant, we obtain, as in Equation (13) below.

$$X=U^*_{freq}HU_{time}, \tag{13}$$

Equation (13) relates to the delay-Doppler representation of H. Equivalently, $H=U_{freq}XU^*_{time}$. In a narrowband scenario where H corresponds to the channel over an RB, $U^*_{freq}H$ is the $N_{sc}$ point DFT of the frequency domain channel windowed over an RB.

$X_{RCE}$ and $X_{ICE}$ are defined as the delay-Doppler representations of $H_{RCE}$ and $H_{ICE}$, i.e., $X_{RCE}=U^*_{freq}H_{RCE}U_{time}$ and $X_{ICE}=U^*_{freq}H_{ICE}U_{time}$. In the Doppler-delay refinement, the input features are constructed by vectorizing the real and imaginary parts of $X_{RCE}$, i.e., as in Equation (14) below.

$$x = \begin{bmatrix} vec(\text{Re}\{X_{RCE}\}) \\ vec(\text{Im}\{X_{RCE}\}) \end{bmatrix}, \tag{14}$$

Similarly, the vector corresponding to the ideal channel is, as in Equation (15) below.

$$y = \begin{bmatrix} vec(\text{Re}\{X_{ICE}\}) \\ vec(\text{Im}\{X_{ICE}\}) \end{bmatrix}. \tag{15}$$

We use an MLP network to approximate the mapping between x and y, and minimize the MSE loss, as in Equation (16) below.

$$L_{DDR} = \frac{\sum_{s=1}^{S} \|MLP_p(x^{(s)}) - y^{(s)}\|^2}{S} \tag{16}$$

This approximation is over a batch of S samples to optimize the weights of the network. The output of the MLP network with DDR is expected to be the delay-Doppler representation of ICE, in an ideal setting.

During inference, the vectorized delay-Doppler representation x is first obtained from $H_{RCE}$ using Equation (15). Then, x is fed into an MLP trained by minimizing $L_{DDR}$. Let $\hat{y}=MLP_{p_{DDR}}(x)$ represent the output of the trained MLP. Then, the refine delay-Doppler representation is expressed as in Equation (17) below.

$$\hat{X}_{DDR} = \text{Reshape}\left(\hat{y}\left[1:\frac{N_{out}}{2}\right], [N_{sc}, N_{sym}-N_{ctrl}]\right) + \tag{17}$$
$$j \, \text{Reshape}\left(\hat{y}\left[1+\frac{N_{out}}{2}:N_{out}\right], [N_{sc}, N_{sym}-N_{ctrl}]\right).$$

The refined time-frequency channel $\hat{H}_{DDR}$ is computed as in Equation (18) below.

$$\hat{H}_{DDR}=U_{freq}\hat{X}_{DDR}U^*_{time}. \tag{18}$$

The input and output features used in the Doppler-delay technique differ from the time-frequency refinement technique only by a linear transformation defined by Equation (13). Due to the use of linear activation at the input and output layers of our MLP, such a transformation can be learned by the network, making the two methods similar. However, the Doppler-delay technique may enable a simpler implementation of channel estimation refinement.

The learning method described herein uses the 2D-DFT of the time-frequency channel for learning, i.e., $X=U_{freq}HU_{time}$ to construct the input features. Such an approach aids a convenient implementation of the disclosed algorithms using a 2D-Fast Fourier transform. The performance with these features is identical to that with the delay Doppler representation, which is a permuted version of the 2D-DFT of H.

In order to reduce the dimension of the input features to the neural network, channel estimation enhancement based only on DMRS symbols and without a time interpolation layer is further disclosed. Two different network structures are utilized, as described below in reference to FIGS. 8 and 9.

Figure 8:
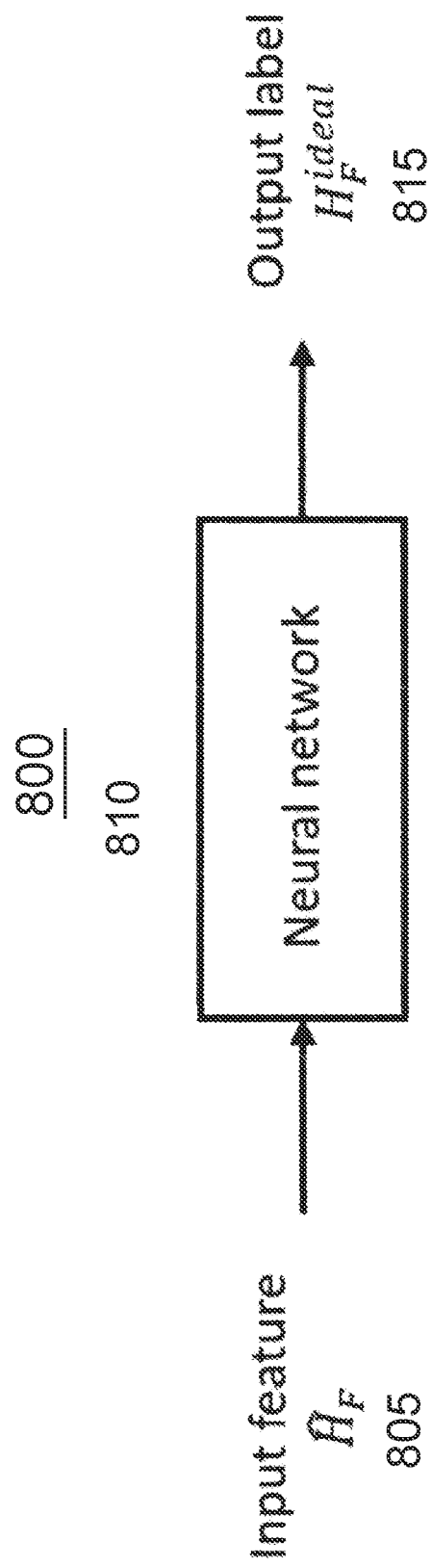
FIG. 8 illustrates a network structure without a time interpolation layer, according to an embodiment.

FIG. 8 illustrates a network structure 800 without a time interpolation layer, according to an embodiment. In FIG. 8, all weights in the neural network 810 are trainable. The input features are frequency interpolated channel estimates $\hat{H}_F$ 805 from the conventional channel estimation algorithm, which contains channel estimates at all REs within a unit of resource in the frequency domain, and REs where the DMRS is transmitted in the time domain. The output features are an output from the neural network 810 and are an ideal channel $H_F^{ideal}$ 815 corresponding to the same REs as in $\hat{H}_F$ 805.

As a result, the cost function to train the network in FIG. 8 involves only $\hat{H}_F$ 805 and $H_F^{ideal}$ 815, as given in Equation (19) below.

$$\hat{\theta} = \operatorname*{argmin}_{\theta} \frac{1}{K} \sum_{k=1}^{K} \|f_\theta(\hat{H}_{F,k}) - H_{F,k}^{ideal}\|_F^2 \qquad (19)$$

In Equation (19), $\hat{H}_{F,k}$ and $H_{F,k}^{ideal}$ denotes the k-th input feature and output label, arg min refers to the argument of the minimum, and the total number of samples for training is K. $f_\theta(\cdot)$ denotes the neural network with trainable weights $\theta$. $\|\cdot\|_F^2$ denotes the Frobenius norm. $\hat{\theta}$ is obtained after the neural network is trained.

In this embodiment, the denoising autoencoder is used fewer inputs within a unit than the embodiment described in reference to FIG. 4, which may result in the use of a smaller and further simplified neural network.

Figure 9:
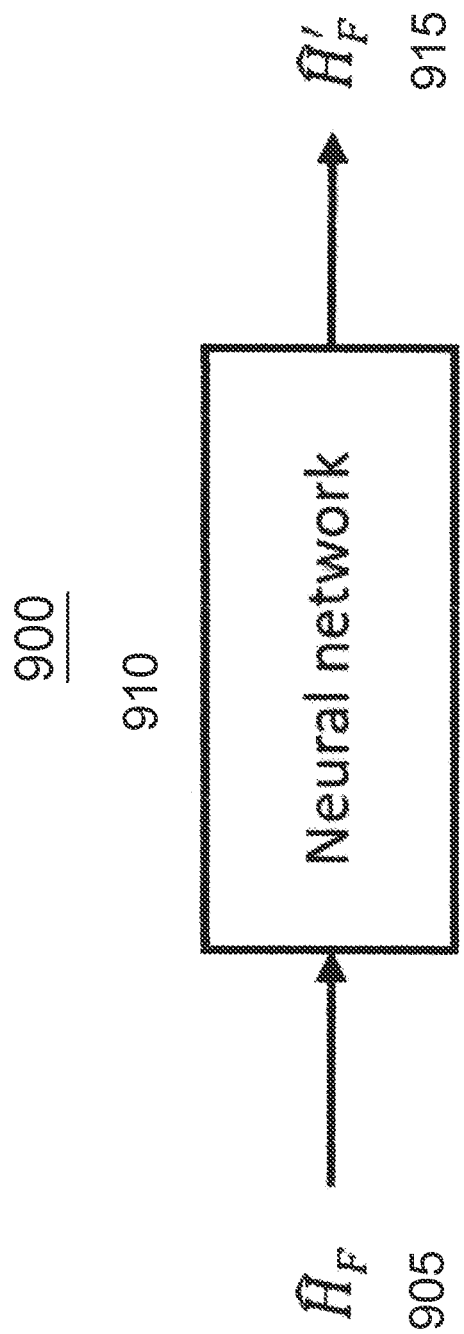
FIG. 9 illustrates a channel estimation enhancement based on a neural network without a time interpolation layer, according to an embodiment.

FIG. 9 illustrates a process 900 of a channel estimation enhancement based on a neural network without a time interpolation layer, according to an embodiment. During inference, after $\hat{H}_F$ 905 is estimated by the conventional channel estimation algorithm, $\hat{H}_F$ 905 is fed into the neural network 910 and the output is the refined channel $\hat{H}'_F$ 915, as shown in FIG. 9. The refined channel $\hat{H}'_F$ 915 is calculated as shown in Equation (20) below.

$$\hat{H}'_F = f_{\hat{\theta}}(\hat{H}_F) \qquad (20)$$

In Equation (20), $\hat{H}'_F$ contains the same set of REs as $\hat{H}_F$, i.e., all REs within an RB in the frequency domain, and REs where the DMRS is transmitted in the time domain. As described above in FIG. 3, the time-frequency domain enhanced channel $\hat{H}'_{TF}$ is ultimately obtained by applying the conventional time interpolation to $\hat{H}'_F$.

Figure 10:
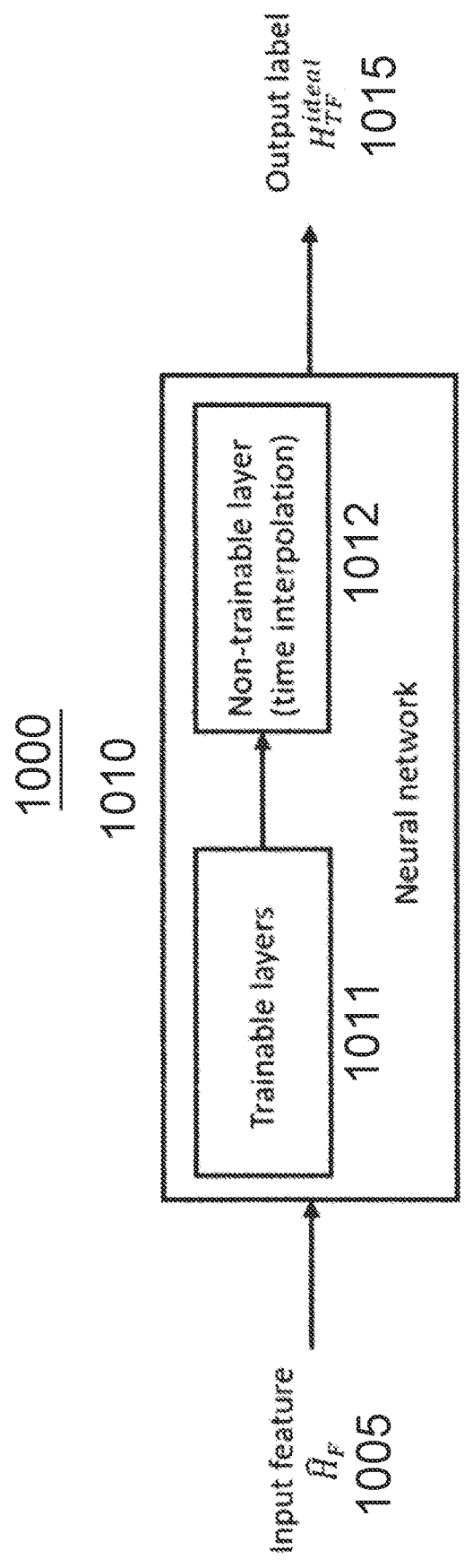
FIG. 10 illustrates a network structure with a time interpolation layer, according to an embodiment.

FIG. 10 illustrates a network structure 1000 with a time interpolation layer, according to an embodiment. Specifically, the network structure described above in FIG. 9 does not include time interpolation; as such, time interpolation is applied after the enhanced channel $\hat{H}'_F$ 915 is obtained. Alternatively, as illustrated in FIG. 10, the time interpolation is incorporated into the neural network 1010 in a non-trainable layer 1012.

That is, the neural network 1010 in FIG. 10 contains two types of hidden layers, i.e., trainable layers 1011 and a non-trainable layer 1012. The trainable layers 1011 are identical to those in a conventional neural network, while the non-trainable layer 1012 performs the time interpolation. The weights for this non-trainable layer 1012 are fixed according to the time interpolation process in the conventional channel estimation algorithm and are not updated during the training. In FIG. 10, the input to the neural network 1010 is the frequency interpolated channel estimates $\hat{H}_F$ 1005 from the conventional channel estimation algorithm, which contain channel estimates at all REs within a RB in the frequency domain, and REs where the DMRS is transmitted in the time domain. As to the non-trainable layer 1012, the output labels are a time-frequency domain ideal channel $H_{TF}^{ideal}$ 1015 which contains channel estimates at all REs within an RB in the frequency domain, and all REs where either the DMRS or data is transmitted in the time domain.

The cost function to train the network in FIG. 10 is given below in Equation (21) below.

$$\hat{\theta} = \operatorname*{argmin}_{\theta} \frac{1}{K} \sum_{k=1}^{K} \|f_{\theta,\gamma_k}(\hat{H}_{F,k}) - H_{TF,k}^{ideal}\|_F^2 \qquad (21)$$

In Equation (21), arg min refers to the argument of the minimum, $f_{\theta,\gamma_k}(\cdot)$ denotes the neural network with trainable weights $\theta$ and non-trainable weights $\gamma_k$. Note that the non-trainable weights can differ for different training data samples since these weights are determined by the time interpolation coefficients from the conventional channel estimation algorithm for each specific training data sample. Therefore, to train the network in FIG. 10, the training data set should include the input features, the output labels, and the time interpolation coefficients, i.e., $\{\hat{H}_{F,k}, H_{TF,k}^{ideal}, \gamma_k\}$.

Only the trainable layers are applied during inference after the neural network is trained, as shown in Equation (22) below.

$$\hat{H}'_F = f_{\hat{\theta}}(\hat{H}_F) \qquad (22)$$

In Equation (22), $\hat{\theta}$ denotes the trainable weights obtained during network training.

As described in reference to FIG. 10, the conventional time interpolation scheme is absorbed into the network but with a flag of non-trainable weights. The training stage is described in FIG. 10. Specifically, since FIG. 10 is only applied to the training stage, not to the inference stage, time interpolation during the training stage in FIG. 10 is reflected but the training output is generated at the stage before time interpolation is applied.

Figure 11:
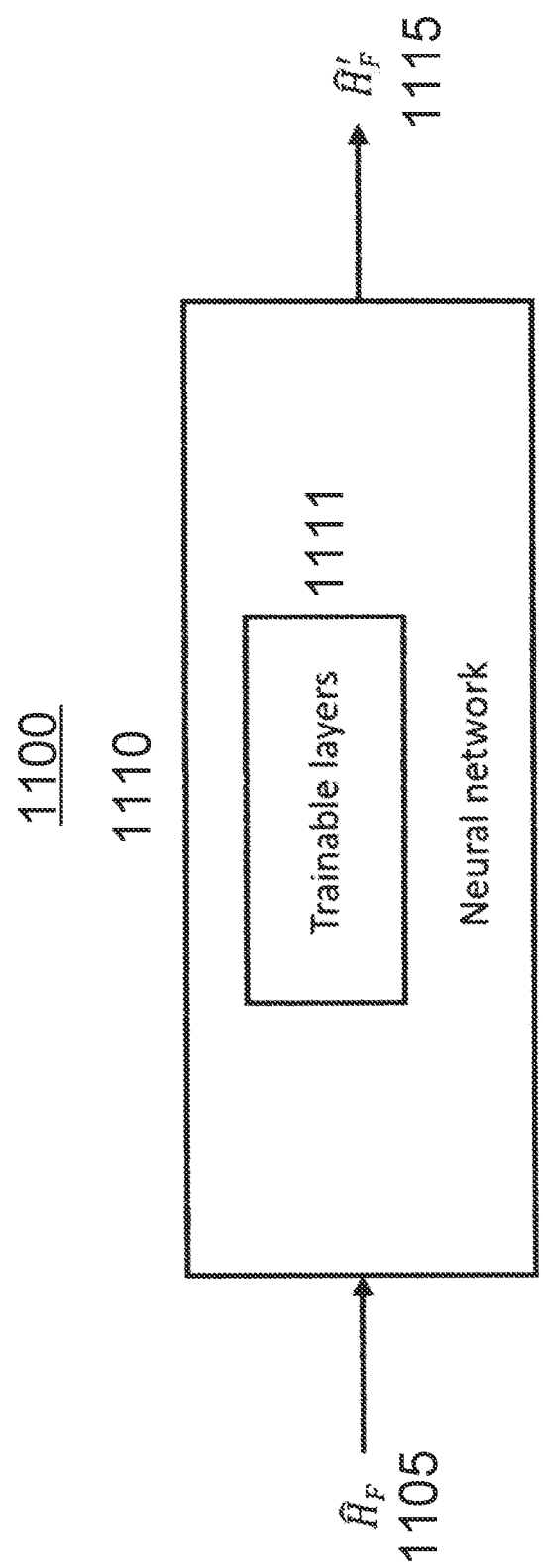
FIG. 11 illustrates a channel estimation enhancement based on a neural network with a time interpolation layer, according to an embodiment.

FIG. 11 illustrates a process 1100 of a channel estimation enhancement based on a neural network with a time interpolation layer, according to an embodiment. Specifically, while the training state is in FIG. 10, the inference stage is described in FIG. 11. These two stages are directed to refinement of all PDSCHs in a unit.

The input to the neural network 1110 in FIG. 11 is the frequency interpolated channel estimates $\hat{H}_F$ 1105 from the conventional channel estimation algorithm. After the enhanced channel $\hat{H}'_F$ 1115 is calculated in Equation (6), the time interpolation is applied to arrive at the final time-frequency domain channel $\hat{H}'_{TF}$.

Figure 12:
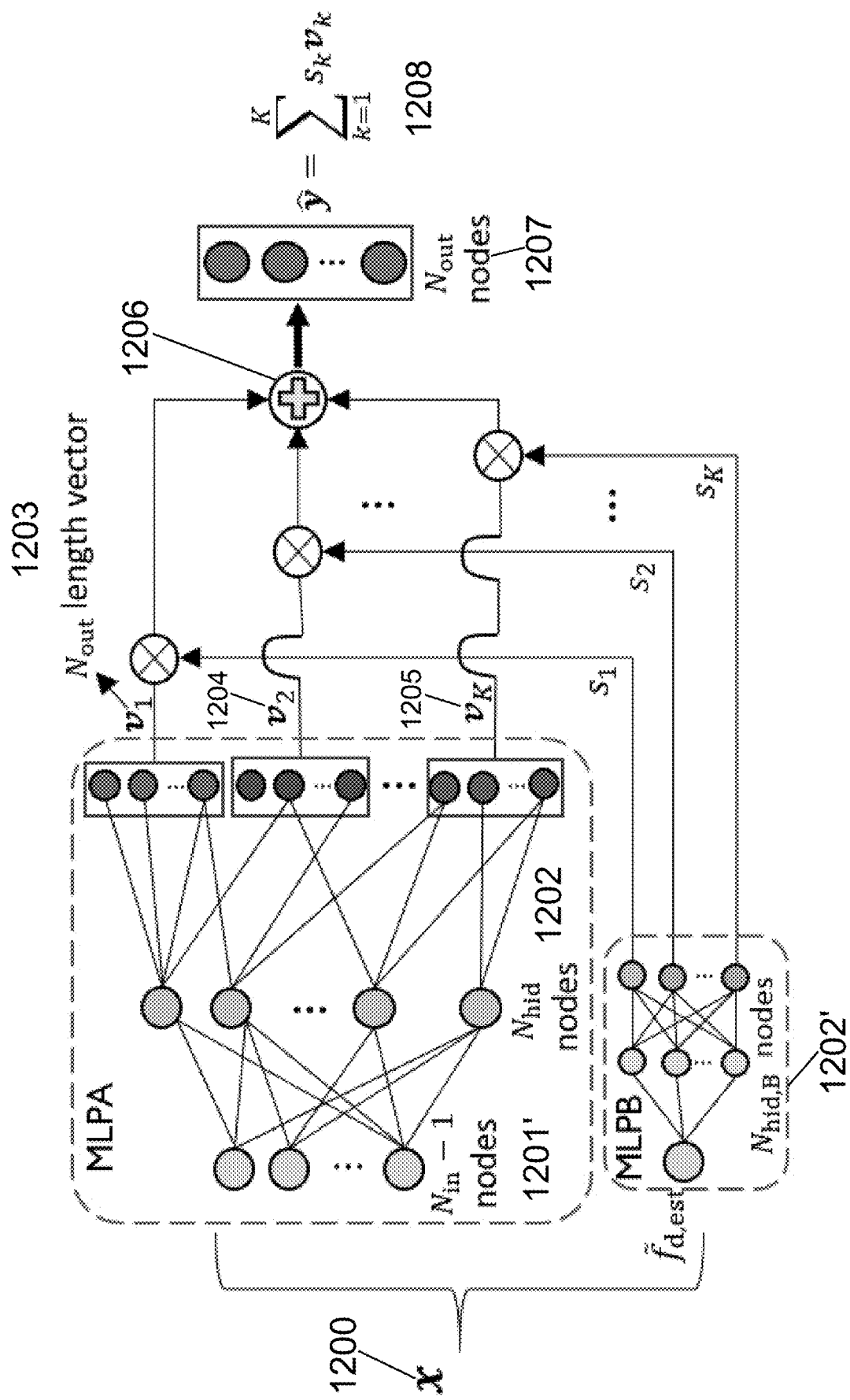
FIG. 12 illustrates DMRS-based channel estimation with attention learning, according to an embodiment.

FIG. 12 illustrates a structure 1200 of DMRS-based channel estimation with attention learning, according to an embodiment.

In FIG. 12, attention learning is combined with weighting of a Doppler estimate. The normalized Doppler spread estimate is incorporated into the neural network through attention learning, thereby arriving at a super network x 1200.

The super network x 1200 includes a primary MLP network (MLPA) and a secondary MLP network (MLPB), where MLPA outputs several candidate nodes $N_{in}-1$ (1201'), $N_{hid}-1$ (1201") for the refined frequency domain interpolated channels. These candidate nodes 1201', 1201" are then weighted with attention metrics based on nodes $N_{hid,B}$ 1202' output from MLPB, resulting in weighted vectors 1203, 1204, 1205 that are summed 1206 to arrive at the output nodes $N_{out}$ 1207 and the final network output ŷ 1208.

Specifically, the network shown in FIG. 12 includes an input layer, a hidden layer and an output layer of dimensions $N_{in}$, $N_{hid}$ and $N_{out}$. We use $W_1 \in \mathbb{R}^{N_{hid} \times N_{in}}$ to denote the weights of the first layer, i.e., the weights that represent the connections between the input $N_{in}$ and the hidden $N_{hid}$ layers. The second layer weights which represent the connections between the hidden $N_{hid}$ and the output $N_{out}$ layers are denoted by $W_2 \in \mathbb{R}^{N_{hid} \times N_{in}}$. Furthermore, we use $b_1$ and $b_2$ to denote the bias at the hidden $N_{hid}$ and the output $N_{out}$ layers. The input to any node in the network is referred to herein an activation. These activations pass through an activation function before they are sent to the next layer. Let $Act_1(\cdot)$ and $Act_2(\cdot)$ denote the activation functions at the hidden $N_{hid}$ and the output $N_{out}$ layers. When a $N_{in} \times 1$ vector x is applied as an input to the network, the output of the network is given by Equation (23) below.

$$y = Act_2(W_2 Act_1(W_1 x + b_1) + b_2). \quad (23)$$

The computation to find y from x is $N_{hid}(N_{in}+1)+N_{out}(N_{hid}+1)$, which is mainly due to matrix multiplications at the first and the second layers.

A rectified linear (ReLU) activation function is used for $Act_1(\cdot)$, i.e., $Act_1(x) = \max(x, 0)$. As channel estimation and channel coefficients can take both positive and negative values, the linear activation $Act_2(x) = x$ is used at the output layer. The weights and biases of this two-layer network are stacked in a parameter vector, as in Equation (24) below.

$$p = (vec(W_1); b_1; vec(W_2); b_2), \quad (24)$$

Equation (23) may be expressed in compact form as $y = MLP_p(x)$. The weights of the MLP network are trained using a backpropagation algorithm to minimize the loss between the predicted channel and the ideal channel.

The above-described aspects of the disclosure can be realized in other situations as set forth below in Table 1.

TABLE 1

| Item | Can the item be generalized? | Specific implementation | Other options |
| --- | --- | --- | --- |
| Input feature | Yes (partially) | The input feature sare either $\hat{H}_{TF}$ or $\hat{H}_F$ and contain all REs within an RB in the frequency domain | In the frequency domain, any number of REs within a PRG can be used. For example, the input features can be all REs within a PRG. |
| Neural network structure | Yes | MLP | As to network type, a network other than an MLP network can be applied, e.g., convolutional neural network. As to network architecture, a different number of hidden layers and nodes within each hidden layer may be applied |

Figure 13:
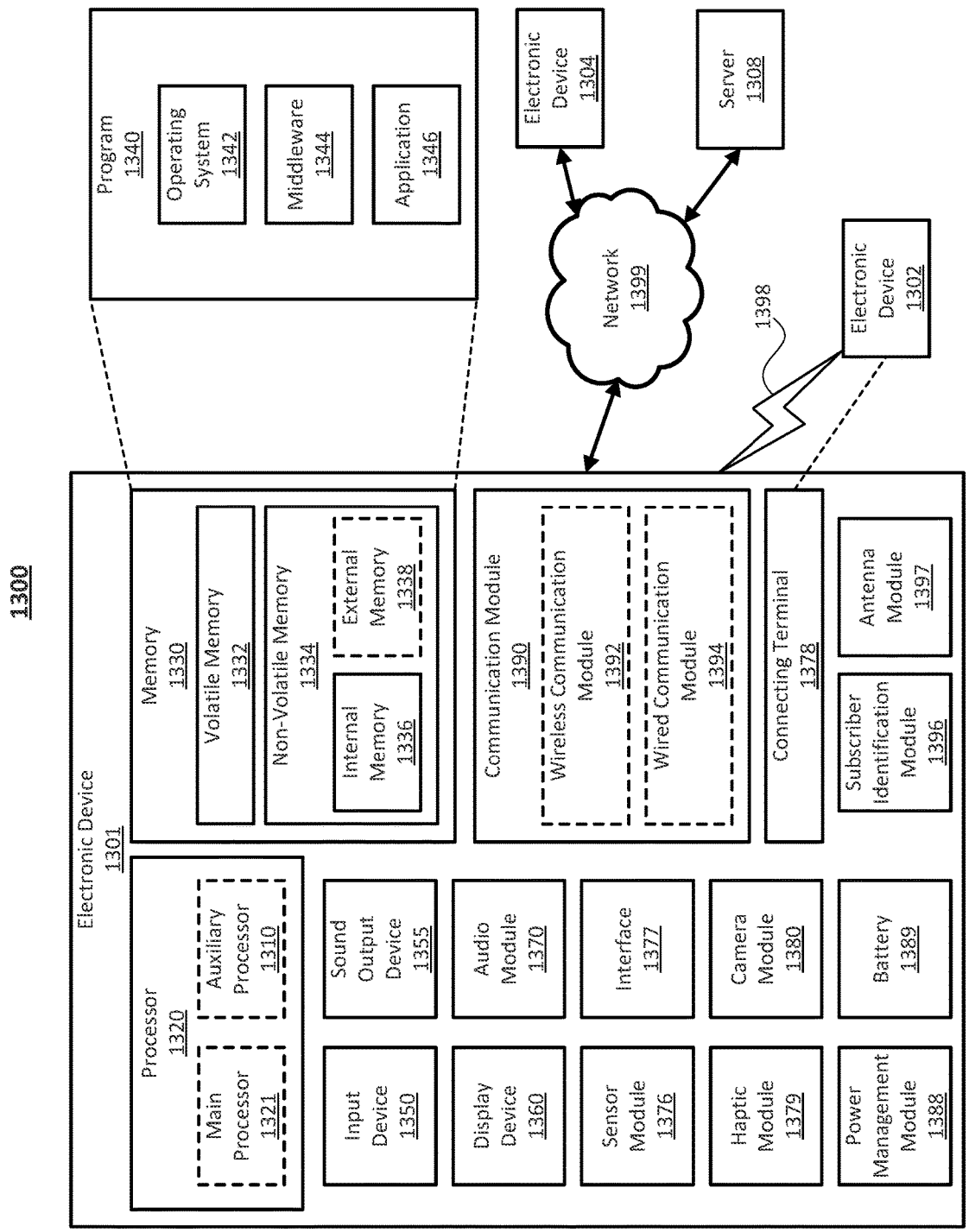
FIG. 13 is a block diagram of an electronic device in a network environment according to an embodiment.

FIG. 13 is a block diagram of an electronic device in a network environment 1300, according to an embodiment. Referring to FIG. 13, an electronic device 1301 in a network environment 1300 may communicate with an electronic device 1302 via a first network 1398 (e.g., a short-range wireless communication network), or an electronic device 1304 or a server 1308 via a second network 1399 (e.g., a long-range wireless communication network). The electronic device 1301 may communicate with the electronic device 1304 via the server 1308. The electronic device 1301 may include a processor 1320, a memory 1330, an input device 1340, a sound output device 1355, a display device 1360, an audio module 1370, a sensor module 1376, an interface 1377, a haptic module 1379, a camera module 1380, a power management module 1388, a battery 1389, a communication module 1390, a subscriber identification module (SIM) card 1396, or an antenna module 1394. In one embodiment, at least one (e.g., the display device 1360 or the camera module 1380) of the components may be omitted from the electronic device 1301, or one or more other components may be added to the electronic device 1301. Some of the components may be implemented as a single integrated circuit (IC). For example, the sensor module 1376 (e.g., a fingerprint sensor, an iris sensor, or an illuminance sensor) may be embedded in the display device 1360 (e.g., a display).

The processor 1320 may execute, for example, software (e.g., a program 1340) to control at least one other component (e.g., a hardware or a software component) of the electronic device 1301 coupled with the processor 1320 and may perform various data processing or computations. As at least part of the data processing or computations, the processor 1320 may load a command or data received from another component (e.g., the sensor module 1346 or the communication module 1390) in volatile memory 1332, process the command or the data stored in the volatile memory 1332, and store resulting data in non-volatile memory 1334. The processor 1320 may include a main processor 1321 (e.g., a central processing unit (CPU) or an application processor (AP)), and an auxiliary processor 1323 (e.g., a graphics processing unit (GPU), an image signal processor (ISP), a sensor hub processor, or a communication processor (CP)) that is operable independently from, or in conjunction with, the main processor 1321. Additionally or alternatively, the auxiliary processor 1323 may be adapted to consume less power than the main processor 1321, or execute a particular function. The auxiliary processor 1323 may be implemented as being separate from, or a part of, the main processor 1321.

The auxiliary processor 1323 may control at least some of the functions or states related to at least one component (e.g., the display device 1360, the sensor module 1376, or the communication module 1390) among the components of the electronic device 1301, instead of the main processor 1321 while the main processor 1321 is in an inactive (e.g., sleep) state, or together with the main processor 1321 while the main processor 1321 is in an active state (e.g., executing an application). The auxiliary processor 1323 (e.g., an image signal processor or a communication processor) may be implemented as part of another component (e.g., the camera module 1380 or the communication module 1390) functionally related to the auxiliary processor 1323.

The memory 1330 may store various data used by at least one component (e.g., the processor 1320 or the sensor module 1376) of the electronic device 1301. The various data may include, for example, software (e.g., the program 1340) and input data or output data for a command related thereto. The memory 1330 may include the volatile memory 1332 or the non-volatile memory 1334.

The program 1340 may be stored in the memory 1330 as software, and may include, for example, an operating system (OS) 1342, middleware 1344, or an application 1346.

The input device 1350 may receive a command or data to be used by another component (e.g., the processor 1320) of the electronic device 1301, from the outside (e.g., a user) of the electronic device 501. The input device 1350 may include, for example, a microphone, a mouse, or a keyboard.

The sound output device 1355 may output sound signals to the outside of the electronic device 1301. The sound output device 1355 may include, for example, a speaker or a receiver. The speaker may be used for general purposes, such as playing multimedia or recording, and the receiver may be used for receiving an incoming call. The receiver may be implemented as being separate from, or a part of, the speaker.

The display device 1360 may visually provide information to the outside (e.g., a user) of the electronic device 1301. The display device 1360 may include, for example, a display, a hologram device, or a projector and control circuitry to control a corresponding one of the display, hologram device, and projector. The display device 1360 may include touch circuitry adapted to detect a touch, or sensor circuitry (e.g., a pressure sensor) adapted to measure the intensity of force incurred by the touch.

The audio module 1370 may convert a sound into an electrical signal and vice versa. The audio module 1370 may obtain the sound via the input device 1350 or output the sound via the sound output device 1355 or a headphone of an external electronic device 1302 directly (e.g., wired) or wirelessly coupled with the electronic device 1301.

The sensor module 1376 may detect an operational state (e.g., power or temperature) of the electronic device 1301 or an environmental state (e.g., a state of a user) external to the electronic device 1301, and then generate an electrical signal or data value corresponding to the detected state. The sensor module 1376 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1377 may support one or more specified protocols to be used for the electronic device 1301 to be coupled with the external electronic device 1302 directly (e.g., wired) or wirelessly. The interface 1377 may include, for example, a high-definition multimedia interface (HDMI), a universal serial bus (USB) interface, a secure digital (SD) card interface, or an audio interface.

A connecting terminal 1378 may include a connector via which the electronic device 1301 may be physically connected with the external electronic device 1302. The connecting terminal 1378 may include, for example, an HDMI connector, a USB connector, an SD card connector, or an audio connector (e.g., a headphone connector).

The haptic module 1379 may convert an electrical signal into a mechanical stimulus (e.g., a vibration or a movement) or an electrical stimulus which may be recognized by a user via tactile sensation or kinesthetic sensation. The haptic module 1379 may include, for example, a motor, a piezoelectric element, or an electrical stimulator.

The camera module 1380 may capture a still image or moving images. The camera module 1380 may include one or more lenses, image sensors, image signal processors, or flashes.

The power management module 1388 may manage power supplied to the electronic device 1301. The power management module 1388 may be implemented as at least part of, for example, a power management integrated circuit (PMIC).

The battery 1389 may supply power to at least one component of the electronic device 1301. The battery 1389 may include, for example, a primary cell which is not rechargeable, a secondary cell which is rechargeable, or a fuel cell.

The communication module 1390 may support establishing a direct (e.g., wired) communication channel or a wireless communication channel between the electronic device 1301 and the external electronic device (e.g., the electronic device 1302, the electronic device 1304, or the server 1308) and performing communication via the established communication channel. The communication module 1390 may include one or more communication processors that are operable independently from the processor 1320 (e.g., the AP) and supports a direct (e.g., wired) communication or a wireless communication. The communication module 1390 may include a wireless communication module 1392 (e.g., a cellular communication module, a short-range wireless communication module, or a global navigation satellite system (GNSS) communication module) or a wired communication module 1394 (e.g., a local area network (LAN) communication module or a power line communication (PLC) module). A corresponding one of these communication modules may communicate with the external electronic device via the first network 1398 (e.g., a short-range communication network, such as Bluetooth™, wireless-fidelity (Wi-Fi) direct, or a standard of the Infrared Data Association (IrDA)) or the second network 1399 (e.g., a long-range communication network, such as a cellular network, the Internet, or a computer network (e.g., LAN or wide area network (WAN)). These various types of communication modules may be implemented as a single component (e.g., a single IC), or may be implemented as multiple components (e.g., multiple ICs) that are separate from each other. The wireless communication module 1392 may identify and authenticate the electronic device 1301 in a communication network, such as the first network 1398 or the second network 1399, using subscriber information (e.g., international mobile subscriber identity (IMSI)) stored in the subscriber identification module 1396.

The antenna module 1397 may transmit or receive a signal or power to or from the outside (e.g., the external electronic device) of the electronic device 701. The antenna module 1397 may include one or more antennas, and, therefrom, at least one antenna appropriate for a communication scheme used in the communication network, such as the first network 1398 or the second network 1399, may be selected, for example, by the communication module 1390

(e.g., the wireless communication module 1392). The signal or the power may then be transmitted or received between the communication module 1390 and the external electronic device via the selected at least one antenna.

FIG. 14 illustrates a denoising autoencoder 1400 to which the disclosure is applied. Specifically, the structure of the denoising autoencoder 1400 including a corrupt input 1401, hidden layer 1402 and output layer 1403 is well known in the art, such that a further description thereof will be omitted herein for the sake of conciseness.

At least some of the above-described components may be mutually coupled and communicate signals (e.g., commands or data) therebetween via an inter-peripheral communication scheme (e.g., a bus, a general purpose input and output (GPIO), a serial peripheral interface (SPI), or a mobile industry processor interface (MIPI)).

Commands or data may be transmitted or received between the electronic device 1301 and the external electronic device 1304 via the server 1308 coupled with the second network 1399. Each of the electronic devices 1302 and 1304 may be a device of a same type as, or a different type, from the electronic device 1301. All or some of operations to be executed at the electronic device 1301 may be executed at one or more of the external electronic devices 1302, 1304, or 1308. For example, if the electronic device 1301 should perform a function or a service automatically, or in response to a request from a user or another device, the electronic device 1301, instead of, or in addition to, executing the function or the service, may request the one or more external electronic devices to perform at least part of the function or the service. The one or more external electronic devices receiving the request may perform the at least part of the function or the service requested, or an additional function or an additional service related to the request and transfer an outcome of the performing to the electronic device 1301. The electronic device 1301 may provide the outcome, with or without further processing of the outcome, as at least part of a reply to the request. To that end, a cloud computing, distributed computing, or client-server computing technology may be used, for example.

While the present disclosure has been described with reference to certain embodiments, various changes may be made without departing from the spirit and the scope of the disclosure, which is defined, not by the detailed description and embodiments, but by the appended claims and their equivalents.

What is claimed is:

1. An electronic device, comprising:
   at least one processor; and
   at least one memory operatively connected with the at least one processor, the at least one memory storing instructions, which when executed, instruct the at least one processor to:
   perform frequency interpolation on a channel estimation at all resource elements (REs) located where a demodulation reference signal (DMRS) is transmitted;
   perform time interpolation on a frequency domain interpolated channel obtained from the frequency interpolation; and
   calculate an enhanced channel estimation based on channel estimates at REs in a frequency domain and REs in a time domain, the channel estimates being output from the time interpolation.

2. The electronic device of claim 1,
   wherein the calculation of the enhanced channel estimation is further based on all of the REs within a resource block in the frequency domain and all of the REs where either the DMRS or data is transmitted in the time domain.

3. The electronic device of claim 1, wherein the instructions further instruct the at least one processor to apply a Doppler-delay domain enhancement to the channel estimates.

4. The electronic device of claim 1, wherein the frequency interpolation is performed using a neural network trained to optimize accuracy of the channel estimation.

5. The electronic device of claim 1, wherein the time interpolation includes a smoothing process to minimize estimation errors.

6. The electronic device of claim 1, wherein the instructions further instruct the at least one processor to output a time-frequency domain refined channel estimation based on the enhanced channel estimation.

7. An electronic device, comprising:
   at least one processor; and
   at least one memory operatively connected with the at least one processor, the at least one memory storing instructions, which when executed, instruct the at least one processor to:
   perform frequency interpolation on a channel estimation at all resource elements (REs) located where a demodulation reference signal (DMRS) is transmitted;
   calculate an enhanced channel estimation based on a frequency domain interpolated channel obtained from the frequency interpolation; and
   perform time interpolation on the enhanced channel estimation.

8. The electronic device of claim 7,
   wherein the calculation of the enhanced channel estimation is further based on all of the REs within a resource block in the frequency domain and all of the REs where either the DMRS or data is transmitted in the time domain.

9. The electronic device of claim 7, wherein the frequency interpolation is performed using a neural network trained to optimize accuracy of the channel estimation.

10. The electronic device of claim 7, wherein the instructions further instruct the at least one processor to output a time-frequency domain refined channel estimation based on the enhanced channel estimation.

11. The electronic device of claim 7, wherein the time interpolation includes a smoothing process to minimize estimation errors.

12. An electronic device, comprising:
    at least one processor; and
    at least one memory operatively connected with the at least one processor, the at least one memory storing instructions, which when executed, instruct the at least one processor to:
    perform frequency interpolation on a channel estimation at all resource elements (REs) located where a demodulation reference signal (DMRS) is transmitted;
    perform time interpolation on a frequency domain interpolated channel obtained from the frequency interpolation;
    perform training of a neural network based on channel estimates at REs in a frequency domain and REs in a time domain as input from the time interpolation; and
    output a time and frequency domain ideal channel based on the training of the neural network.

13. The electronic device of claim 12, further comprising:
    a denoising autoencoder configured to refine all time and frequency REs in each resource block or bundle.

14. The electronic device of claim 13, wherein the denoising autoencoder is configured to operate on a slot-by-slot basis over each RB.

15. The electronic device of claim 12, wherein the instructions further instruct the at least one processor to apply a Doppler-delay domain enhancement to the channel estimates.

16. The electronic device of claim 12, wherein the frequency interpolation is performed using a neural network trained to optimize accuracy of the channel estimation.

17. The electronic device of claim 12, wherein the output time and frequency domain ideal channel is used for, at least one of, equalization, interference whitening, and symbol detection.

18. A method, comprising:
performing frequency interpolation on a channel estimation at all resource elements (REs) where a demodulation reference signal (DMRS) is transmitted;
performing time interpolation on a frequency domain interpolated channel obtained from the frequency interpolation; and
calculating an enhanced channel estimation based on channel estimates at REs in a frequency domain and REs in a time domain, the channel estimates being output from the time interpolation.

19. A method, comprising:
performing frequency interpolation on a channel estimation at all resource elements (REs) where a demodulation reference signal (DMRS) is transmitted;
calculating an enhanced channel estimation based on a frequency domain interpolated channel obtained from the frequency interpolation; and
performing time interpolation on the enhanced channel estimation.

20. A method, comprising:
performing frequency interpolation on a channel estimation at all resource elements (REs) where a demodulation reference signal (DMRS) is transmitted;
performing time interpolation on a frequency domain interpolated channel obtained from the frequency interpolation;
performing training of a neural network based on channel estimates at REs in a frequency domain and REs in a time domain as input from the time interpolation; and
outputting a time and frequency domain ideal channel based on the training of the neural network.

* * * * *